United States Patent [19]
Chiosso

[11] 3,869,829
[45] Mar. 11, 1975

[54] TEACHING AID STRUCTURE

[76] Inventor: Thomas E. Chiosso, 53 Oakwood St., San Francisco, Calif. 9410

[22] Filed: Sept. 26, 1973

[21] Appl. No.: 400,731

[52] U.S. Cl.............. 47/39, 40/152, D6/190, D35/3 C, 47/34.12
[51] Int. Cl............................................... A01g 9/00
[58] Field of Search............. D6/139, 186, 188–190; D35/3; 47/34.12, 17, 40, 39; 40/152

[56] References Cited
UNITED STATES PATENTS
312,159   2/1855   Perkins.................................. 47/40
2,121,173   6/1938   MacPherson.................. 47/34.13 X
2,770,919   11/1956   Shumaker.............................. 47/39

*Primary Examiner*—Robert E. Bagwill
*Attorney, Agent, or Firm*—Phillips, Moore, Weissenberger, Lempio & Strabala

[57] ABSTRACT

A wooden frame defines a plurality of openings. Plants are disposed in alternate openings thereof in the vertical and horizontal directions, and panels having markings thereon, for use as visual aids, are disposed in the remaining openings.

2 Claims, 4 Drawing Figures

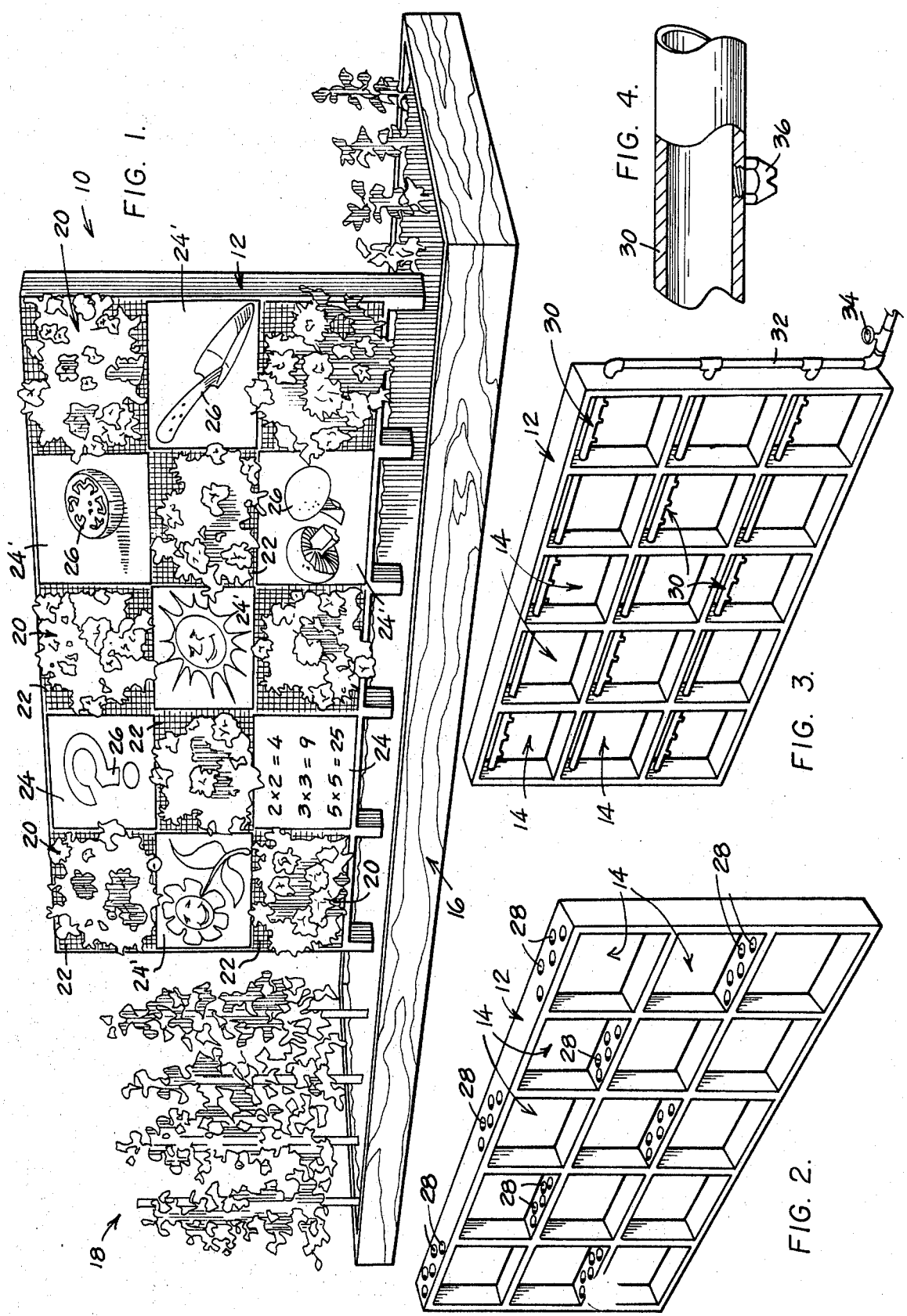

TEACHING AID STRUCTURE

BACKGROUND OF THE INVENTION

This invention relates to teaching aids, and more particularly, to a teaching aid structure comprising plants and visual aids.

The use of visual aids in teaching devices is, of course, well known. It will be understood, of course, that a teaching aid of such type should be effective in the use for which it is primarily designed, i.e., such device should be effective in aiding the instructor in teaching a given subject. The teaching aid may with advantage also be adapted for use in teaching a variety of subjects. In addition, the teaching aid should be attractive in design, so that the students attention is drawn to it.

SUMMARY OF THE INVENTION

It is therefore an object of this invention to provide a teaching or learning aid structure which is effective in aiding the instructor in teaching a given subject.

It is a further object of this invention to provide a teaching or learning aid structure which, while fulfilling the above object, is adaptable for use in teaching a variety of subjects.

It is a still further object of this invention to provide a teaching or learning aid structure which is extremely simple in design.

Broadly stated, the invention comprises a teaching aid structure comprising a rectangular frame defining a plurality of rectangular openings. A plurality of plants are disposed in alternate openings in the vertical and horizontal directions, and are supported relative to the frame. A plurality of visual teaching aids are associated with the remaining openings, each visual teaching aid comprising a panel member having markings thereon. Some of such markings may with advantage be related to plants.

BRIEF DESCRIPTION OF THE DRAWINGS

These and other objects of the invention will become apparent from a study of the following specification and drawings, in which:

FIG. 1 is an overall perspective view of a teaching aid structure incorporating the invention;

FIG. 2 is a perspective view of a first embodiment of the frame which may make up part of the structure shown in FIG. 1;

FIG. 3 is a perspective view of a second embodiment of frame in combination with irrigating structure, which may be used in the teaching aid structure as shown in FIG. 1; and FIG. 4 is an elevational view, partially in section, of a portion of the irrigation pipe system as shown in FIG. 3.

DESCRIPTION OF THE PREFERRED EMBODIMENT

Shown in FIG. 1 is a teaching aid structure 10 incorporating the invention. The structure 10 includes a rectangular wooden frame 12 made up of vertical and horizontal frame members which may be fixed together with a plurality of angle irons and bolts. Such frame 12, it will be seen, defines a plurality of rectangular openings 14 aligned in vertical and horizontal directions, as shown in FIGS. 2 and 3.

The frame 12 may with advantage be mounted in a wooden rectangular base 16 with which plants 18 may be associated. The frame 12 is positioned to stand vertically.

Plants 20 of various types are disposed in alternate openings 14 in the horizontal direction of frame 12, and in alternate openings 14 in the vertical direction of frame 12 as shown in FIG. 1, and are supported by the frame 12. Screens 22 are fixed to the frame 12 over these openings 14 within which plants 20 are disposed, so that the plants 20 are retained therein.

Disposed over the remaining openings 14 and securable to the frame 12 so as to be supported relative thereto are visual teaching aids in the form of panel members 24 having markings 26 thereon. It will be seen in FIG. 1 that some of the markings 26 on the panel members 24, i.e., specifically those panel members noted as 24', relate to plants or agriculture, while other markings may not necessarily related to agriculture, but may be chosen as appropriate, depending on the subject matter to be taught.

It will be understood that the device 10 particularly lends itself to the use of panel members 24 with markings 26 thereon relating to the plants associated with the frame 12.

In FIG. 2 is shown a first embodiment of frame 12. The horizontal members of frame 12 define apertures 28 to allow water to be introduced to the plants 20 from above upon removal of the appropriate panel members 24.

In FIG. 3 is shown another embodiment of frame 12, having associated therewith irrigation branch lines 30 to which water may be directed from a main line 32 upon opening of a valve 34. These irrigation branch lines 30 have associated therewith nozzles 36, one of which is shown in FIG. 4, positioned in appropriate places along the branch lines 30, so that the plants 20 associated with the frame 12 may be irrigated thereby.

It is to be understood that the openings 14 defined by the wooden frame 12 may take a variety of configurations. Thus, it will be understood that they may be of, for example, triangular or hexagonal configuration. It should also be understood that the structure 10 can be used on both sides in the manner described if desired. The overall structure can be designed to be portable, stationary, or may be adapted for indoor use.

The structure 10 has been found to be ideal for use in schools with limited space (such as school yards which are entirely or largely of asphalt). The structure 10 particularly lends itself to use in the teaching of subjects such as science, mathematics, art and ecology. Since the overall design is attractive, such a structure 10 has the added advantage that it beautifies an area where it is used.

Further along this line, purely decorative panels 24 could be used in combination with the plants 20 of the structure 10, and such resulting structure could be used to beautify unsightly areas, or could be used, for example, as balcony railings, giving privacy as well as beauty, or along freeways where vegetation would be an asset but where soil or lack of it is a problem. Such a structure, if properly placed, would also aid in keeping down the noise traveling from one area to another.

Clear glass panels (not shown) may be fixed to the frame over the openings 14 within which the plants 20 are disposed, in place of the screens 22. The plants 20 may conveniently be studied through such panels, it will be understood.

What is claimed is:

1. A structure for use as a teaching aid or the like comprising;
    a frame of rectangular configuration and comprising a plurality of vertical frame members and a plurality of horizontal frame members, defining a plurality of openings, into at least one of which a plant may be positioned for support by said frame;
    a panel member associated with and covering another opening and supported relative to the frame;
    a portion of a horizontal frame member having apertures therethrough, and through which water may travel from above into said one opening, the panel member when so covering said another opening being positioned elevationally above said portion of the frame member, so that access is allowed to said apertures from thereabove only upon removal of said panel member.

2. The structure of claim 1 and further comprising additional panel members, the first-mentioned and additional panel members being disposed over alternate openings in the horizontal direction and alternate openings in the vertical direction.

* * * * *